US010287909B2

(12) United States Patent
Girard

(10) Patent No.: US 10,287,909 B2
(45) Date of Patent: May 14, 2019

(54) METHOD AND KIT FOR PRESERVING A FUEL SYSTEM OF AN AIRCRAFT ENGINE

(71) Applicant: PRATT & WHITNEY CANADA CORP., Longueuil (CA)

(72) Inventor: Alain Girard, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 408 days.

(21) Appl. No.: 14/800,895

(22) Filed: Jul. 16, 2015

(65) Prior Publication Data

US 2016/0349762 A1     Dec. 1, 2016

Related U.S. Application Data

(60) Provisional application No. 62/168,062, filed on May 29, 2015.

(51) Int. Cl.
    *F02C 7/32*           (2006.01)
    *F02B 77/04*         (2006.01)
    (Continued)

(52) U.S. Cl.
    CPC .............. *F01D 25/00* (2013.01); *F02C 7/236* (2013.01); *F01D 21/003* (2013.01);
    (Continued)

(58) Field of Classification Search
    CPC .. F02C 7/22; F02C 7/232; F02C 7/236; F02C 9/26; F02C 9/263; B64D 37/14;
    (Continued)

(56) References Cited

U.S. PATENT DOCUMENTS 3,658,249 A * 4/1972 Sharpe ...................... F02C 7/22
                                                                   239/125
3,665,950 A * 5/1972 Nelson .................... F02C 7/232
                                                                   137/107

(Continued)

FOREIGN PATENT DOCUMENTS

| IL | 198606/02 A | 2/2010 |
| IN | 200900900 | 5/2009 |
| WO | 2008057002 A1 | 3/2008 |

OTHER PUBLICATIONS

English translation of patent document No. WO 2008/057002 dated Mar. 15, 2008; www.google.ca/patents . . . .

(Continued)

*Primary Examiner* — Todd E Manahan
*Assistant Examiner* — Eric W Linderman
(74) *Attorney, Agent, or Firm* — Norton Rose Fulbright Canada LLP

(57) ABSTRACT

A method and kit for preserving a fuel system of an aircraft engine outside of an engine test cell in preparation for a period of inactivity of the aircraft engine are disclosed. The method comprises: supplying preservation fluid to the fuel system of the aircraft engine; generating a signal to cause the opening of a valve of the fuel system using a control device other than the electronic engine controller of the aircraft engine; and driving a fuel pump of the fuel system to cause some of the preservation fluid to flow through the open valve and in at least part of the fuel system of the aircraft engine.

13 Claims, 6 Drawing Sheets

(51) Int. Cl.
*F01D 25/00* (2006.01)
*F02C 7/236* (2006.01)
*F01D 21/00* (2006.01)

(52) U.S. Cl.
CPC ............ *F01D 25/002* (2013.01); *F02B 77/04* (2013.01); *F02C 7/32* (2013.01); *F05D 2220/323* (2013.01); *F05D 2230/72* (2013.01); *F05D 2260/95* (2013.01)

(58) Field of Classification Search
CPC ..... B64D 37/34; F01D 25/002; F01D 21/003; F02B 77/04; B10P 3/14
See application file for complete search history.

(56) References Cited

U.S. PATENT DOCUMENTS

| | | | | |
|---|---|---|---|---|
| 3,688,495 A * | 9/1972 | Fehler | ............... | F02C 9/28 60/39.281 |
| 3,774,394 A * | 11/1973 | Criffield | ............... | F02C 7/232 60/39.091 |
| 4,016,716 A * | 4/1977 | Evans | ............... | F02C 7/232 137/107 |
| 4,020,632 A * | 5/1977 | Coffinberry | ............... | F02C 7/14 123/41.33 |
| 4,041,696 A * | 8/1977 | Morrison | ............... | F02C 7/26 60/39.163 |
| 4,059,123 A * | 11/1977 | Bartos | ............... | B08B 3/00 134/102.2 |
| 4,567,756 A * | 2/1986 | Colborn | ............... | G01R 31/006 73/114.61 |
| 4,606,311 A * | 8/1986 | Reyes | ............... | F02B 77/04 123/198 A |
| 4,706,636 A * | 11/1987 | Davis | ............... | F02D 33/006 123/514 |
| 4,716,531 A * | 12/1987 | Saunders | ............... | G05B 9/03 60/39.091 |
| 4,834,912 A * | 5/1989 | Hodgens, II | ............... | B08B 3/02 134/2 |
| 4,989,561 A * | 2/1991 | Hein | ............... | F02B 77/04 123/198 A |
| 5,063,896 A * | 11/1991 | Hyatt | ............... | F02B 77/04 123/198 A |
| 5,263,885 A * | 11/1993 | Montague | ............... | F01P 3/205 440/88 N |
| 5,339,845 A * | 8/1994 | Huddas | ............... | B08B 9/00 134/169 A |
| 5,686,840 A * | 11/1997 | Johnson | ............... | G01D 18/00 324/542 |
| 5,730,806 A * | 3/1998 | Caimi | ............... | B05B 7/0483 134/102.1 |
| 5,833,765 A * | 11/1998 | Flynn | ............... | F02B 77/04 123/198 A |
| 5,899,073 A * | 5/1999 | Akimaru | ............... | F02C 3/22 60/39.465 |
| 6,225,898 B1 * | 5/2001 | Kamiya | ............... | G07C 5/008 340/10.1 |
| 6,321,151 B1 * | 11/2001 | Shultz | ............... | G01M 15/05 340/12.22 |
| 6,349,537 B1 * | 2/2002 | Newton | ............... | F02C 7/32 60/784 |
| 6,512,970 B1 * | 1/2003 | Albert | ............... | B60W 30/18 701/115 |
| 6,752,159 B1 * | 6/2004 | Kavadeles | ............... | B08B 9/0321 134/102.2 |
| 6,769,943 B1 * | 8/2004 | Abell | ............... | B63C 15/00 440/88 N |
| 6,776,677 B1 * | 8/2004 | Knapp, Jr. | ............... | B63H 21/12 440/88 N |
| 7,065,955 B2 * | 6/2006 | Reback | ............... | F01D 25/002 134/22.12 |
| 7,209,813 B2 * | 4/2007 | Namaky | ............... | H04L 67/125 701/33.2 |
| 7,505,837 B2 * | 3/2009 | Somos | ............... | G01M 17/00 235/472.01 |
| 8,027,763 B2 * | 9/2011 | Webster | ............... | G07C 5/0808 701/33.9 |
| 8,127,524 B2 * | 3/2012 | Falke | ............... | F02C 7/232 417/308 |
| 8,132,398 B2 * | 3/2012 | Wang | ............... | F02C 7/14 60/39.281 |
| 8,301,329 B2 * | 10/2012 | Andreasen | ............... | G07C 5/008 340/438 |
| 8,370,016 B2 * | 2/2013 | Webster | ............... | G07C 5/0816 340/438 |
| 8,494,706 B2 * | 7/2013 | McGaughey | ............... | F04B 17/03 324/503 |
| 8,524,010 B2 * | 9/2013 | Nordlund | ............... | B08B 3/026 134/113 |
| 8,909,416 B2 * | 12/2014 | Chen | ............... | G06F 17/00 701/33.3 |
| 9,081,699 B2 * | 7/2015 | Tsuboi | ............... | G06F 8/67 |
| 9,316,115 B2 * | 4/2016 | Sales | ............... | F01D 25/002 |
| 9,353,691 B2 * | 5/2016 | Simmons | ............... | F02C 9/263 |
| 2002/0069912 A1 * | 6/2002 | Prentice | ............... | F01P 3/205 137/205 |
| 2003/0192300 A1 * | 10/2003 | Mahoney | ............... | F02C 9/263 60/39.281 |
| 2005/0228549 A1 * | 10/2005 | Stickling | ............... | H04B 15/00 701/3 |
| 2006/0260323 A1 * | 11/2006 | Moulebhar | ............... | F01D 21/003 60/793 |
| 2007/0055435 A1 * | 3/2007 | Muramatsu | ............... | F02C 7/22 701/100 |
| 2007/0084210 A1 * | 4/2007 | Pasquinelli | ............... | F01D 17/105 60/772 |
| 2011/0042520 A1 * | 2/2011 | Glaser | ............... | B64D 37/14 244/135 A |
| 2012/0103192 A1 * | 5/2012 | Lam | ............... | B64D 37/10 95/91 |
| 2013/0032215 A1 * | 2/2013 | Streifinger | ............... | F01D 25/002 137/1 |
| 2013/0192679 A1 * | 8/2013 | Ripley | ............... | F02C 7/236 137/2 |
| 2018/0011480 A1 * | 1/2018 | Hiruta | ............... | G05B 23/0208 |
| 2018/0059656 A1 * | 3/2018 | Hiruta | ............... | G05B 23/0243 |

OTHER PUBLICATIONS

Canadian Intellectual Property Office; Office Action dated Dec. 2, 2016 re: Canadian Patent Application No. 2,907,258.
Norton Rose Fulbright; Response to Examiner's Requisition dated Dec. 2, 2016 re: Canadian Patent Application No. 2,907,258; Jun. 2, 2017.

* cited by examiner

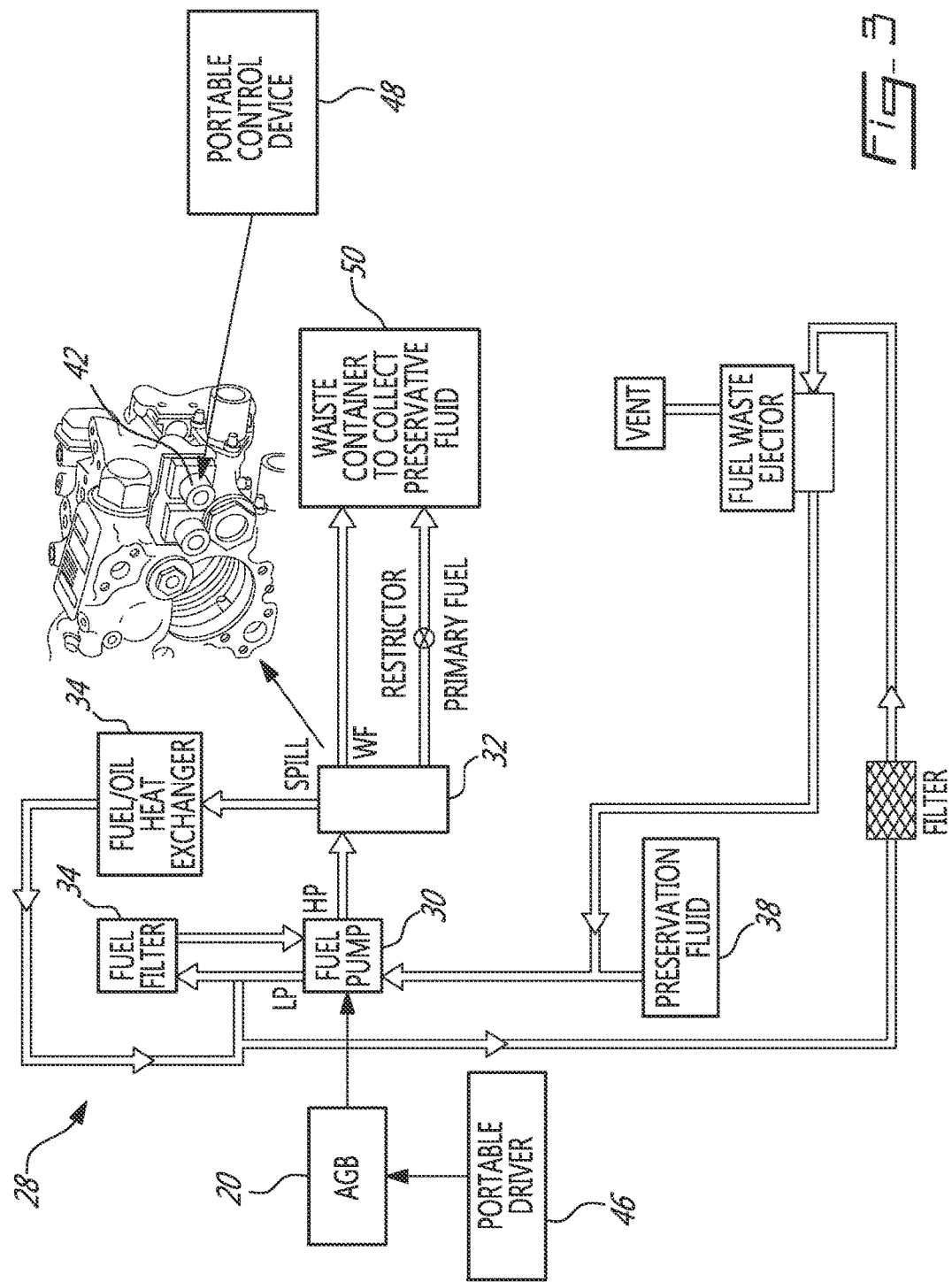

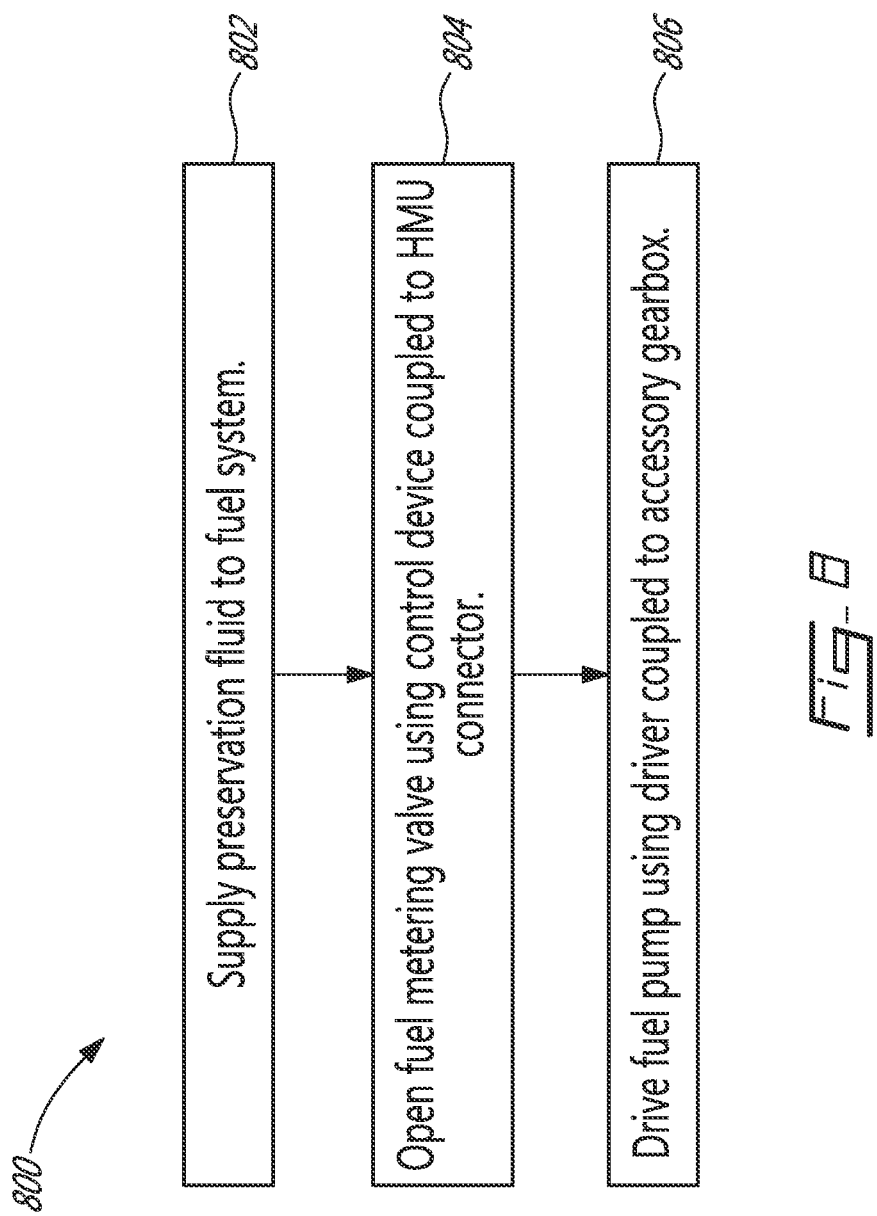

METHOD AND KIT FOR PRESERVING A FUEL SYSTEM OF AN AIRCRAFT ENGINE

CROSS REFERENCE TO RELATED APPLICATION AND CLAIM OF PRIORITY

The present application claims priority to U.S. provisional patent application No. 62/163,062 filed on May 29, 2015, the entire contents of which are hereby incorporated by reference.

TECHNICAL FIELD

The disclosure relates generally to maintenance of aircraft engines, and more particularly to methods, devices and kits for preserving a fuel system of an aircraft engine in preparation for a period of inactivity.

BACKGROUND OF THE ART

Aircraft engine leasing companies can have an inventory of (e.g., gas turbine) engines that are stored for extended periods of time between times when they are leased to an aircraft operator for example. In preparation for such periods of inactivity, the fuel must be flushed out of such engine and replaced with a preservation fluid that protects the fuel system to prevent corrosion or other damage that could be caused by aging fuel.

The replacement of the fuel with the preservation fluid is done in an engine test cell that provides power and an interface with various systems of the engine. Conducting fuel system preservation in a test cell can be relatively expensive in part because of the time the engine must occupy the test cell.

SUMMARY

In one aspect, the disclosure describes a method for preserving a fuel system of an aircraft engine outside of an engine test cell without powering an electronic engine controller of the aircraft engine in preparation for a period of inactivity of the aircraft engine. The method comprises:
 supplying preservation fluid to the fuel system of the aircraft engine;
 opening a valve of the fuel system using a control device, other than the electronic engine controller of the aircraft engine, coupled to the fuel system via a connector configured to provide an interface between the electronic engine controller of the aircraft engine and the fuel system of the aircraft engine; and
 driving a fuel pump of the fuel system using a driver coupled to an accessory gearbox of the aircraft engine to cause some of the preservation fluid to flow through the open valve and in at least part of the fuel system of the aircraft engine.

In another aspect, the disclosure describes a method for preserving a fuel system of an aircraft engine outside of an engine test cell without powering an engine electronic controller of the aircraft engine in preparation for a period of inactivity of the aircraft engine. The method comprising:
 supplying preservation fluid to the fuel system of the aircraft engine;
 generating a signal to cause the opening of a valve of the fuel system using a control device other than the electronic engine controller of the aircraft engine; and
 driving a fuel pump of the fuel system to cause some of the preservation fluid to flow through the open valve and in at least part of the fuel system of the aircraft engine.

In another aspect, the disclosure describes a kit for preserving a fuel system of an aircraft engine outside of an engine test cell without powering an engine electronic controller of the aircraft engine in preparation for a period of inactivity of the aircraft engine. The kit comprises:
 a control device, other than the electronic engine controller of the aircraft engine, configured to:
  be coupled to the fuel system via a connector configured to provide an interface between the electronic engine controller of the aircraft engine and the fuel system of the aircraft engine; and
  cause a valve of the fuel system to open; and
 a driver configured to be coupled to an accessory gearbox of the aircraft engine and drive a fuel pump of the fuel system via the accessory gearbox to cause some of the preservation fluid to flow in at least part of the fuel system of the aircraft engine.

Further details of these and other aspects of the subject matter of this application will be apparent from the detailed description and drawings included below.

DESCRIPTION OF THE DRAWINGS

Reference is now made to the accompanying drawings, in which:

FIG. 3 schematically illustrates an exemplary fuel system of the engine of FIG. 1 in combination with the kit of FIG. 2;

FIG. 8 is a flow chart illustrating an exemplary method for preserving the fuel system of the engine of FIG. 1 outside of an engine test cell in preparation for a period of inactivity of the engine.

DETAILED DESCRIPTION

The present disclosure describes methods, devices and kits for performing fuel system preservation on an aircraft engine that is off-wing without the use of an engine test cell in preparation for a period of inactivity of the engine. In various aspects, the methods, devices and kits disclosed herein may simplify and reduce the cost of performing fuel system preservation. The methods, devices and kits disclosed herein may be particularly suitable for use with smaller aircraft engines. The methods, devices and kits disclosed herein may be particularly suitable for use with gas turbine engines where the starter of the engine is removed from the engine during periods of inactivity (e.g., storage). The devices disclosed herein may be relatively small and easy to handle by maintenance personnel so as to facilitate fuel system preservation.

Aspects of various embodiments are described through reference to the drawings.

Figure 1:
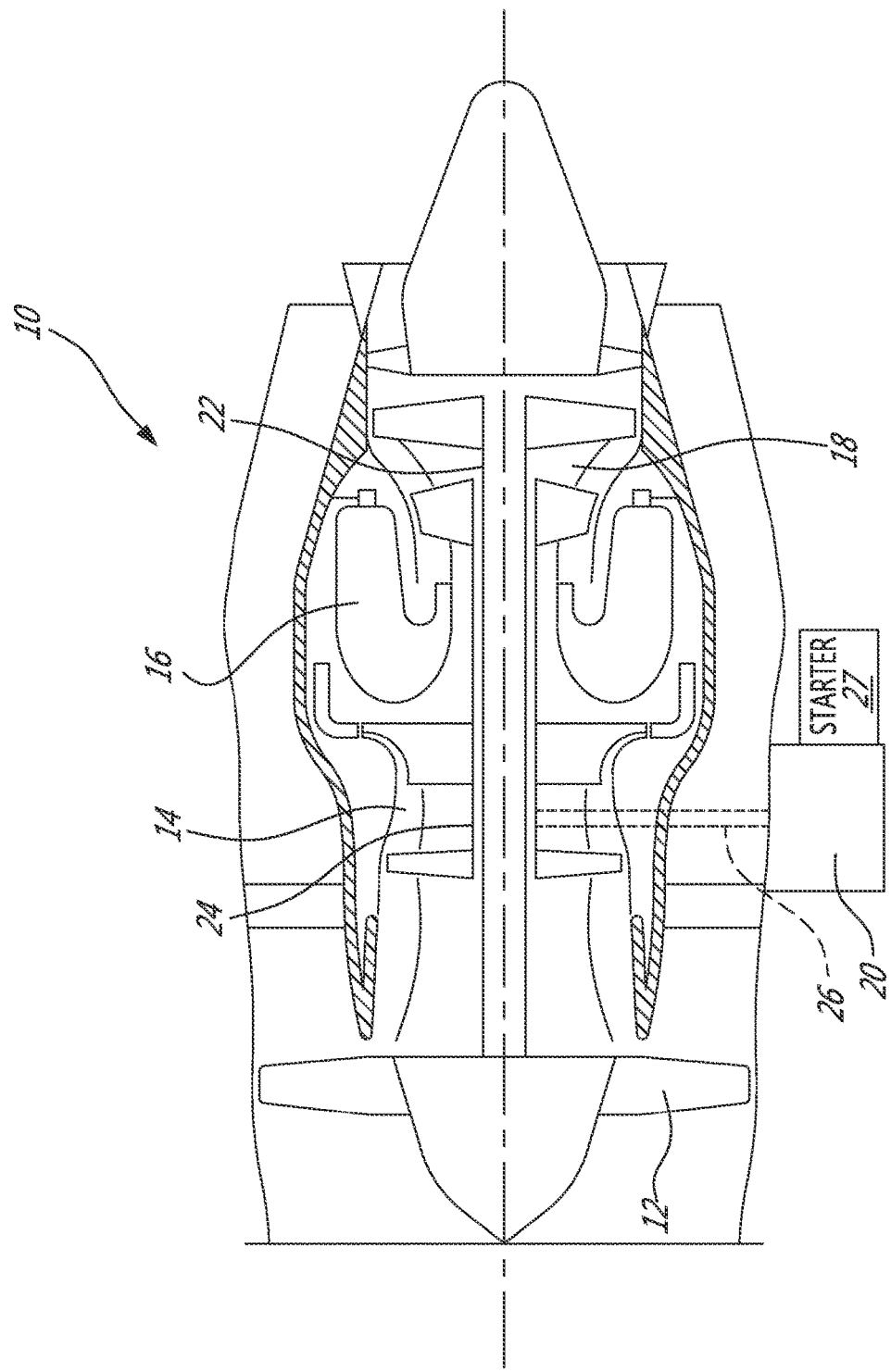
FIG. 1 shows an axial cross-section view of a turbo-fan gas turbine engine suitable for an aircraft application.

FIG. 1 illustrates an aircraft engine 10 of a gas turbine type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may comprise a conventional or other type of gas turbine engine suitable for use in aircraft applications. For example, engine 10 may comprise a turbofan or a turboprop type of aircraft engine.

Engine 10 may comprise accessory gearbox 20 (referred hereinafter as "AGB 20") mechanically coupled to a shaft of engine 10. For example, engine 10 may comprise low-pressure shaft 22 of a low-pressure spool of engine 10 and high-pressure shaft 24 of a high-pressure spool of engine 10. For example, AGB 20 may be mechanically coupled to high-pressure shaft 24 via tower shaft 26. AGB 20 may serve to extract power from engine 10 in order to drive one or more accessories of engine 10 or of an aircraft to which engine 10 may be mounted. For example, AGB 20 may comprise one or more interfaces for transferring power extracted from high-pressure shaft 24 and transferring such power to the accessories such as a fuel pump, an oil pump and/or an electric generator for example. Starter 27 may be coupled to AGB 20 and may be used to inject energy into engine 10 during starting. In some embodiments, starter 27 may be configured to also function as a generator to extract energy from engine 10 during operation in order to generate electricity that may be used for the operation of engine 10 and/or an aircraft to which engine 10 may be mounted.

Figure 2:
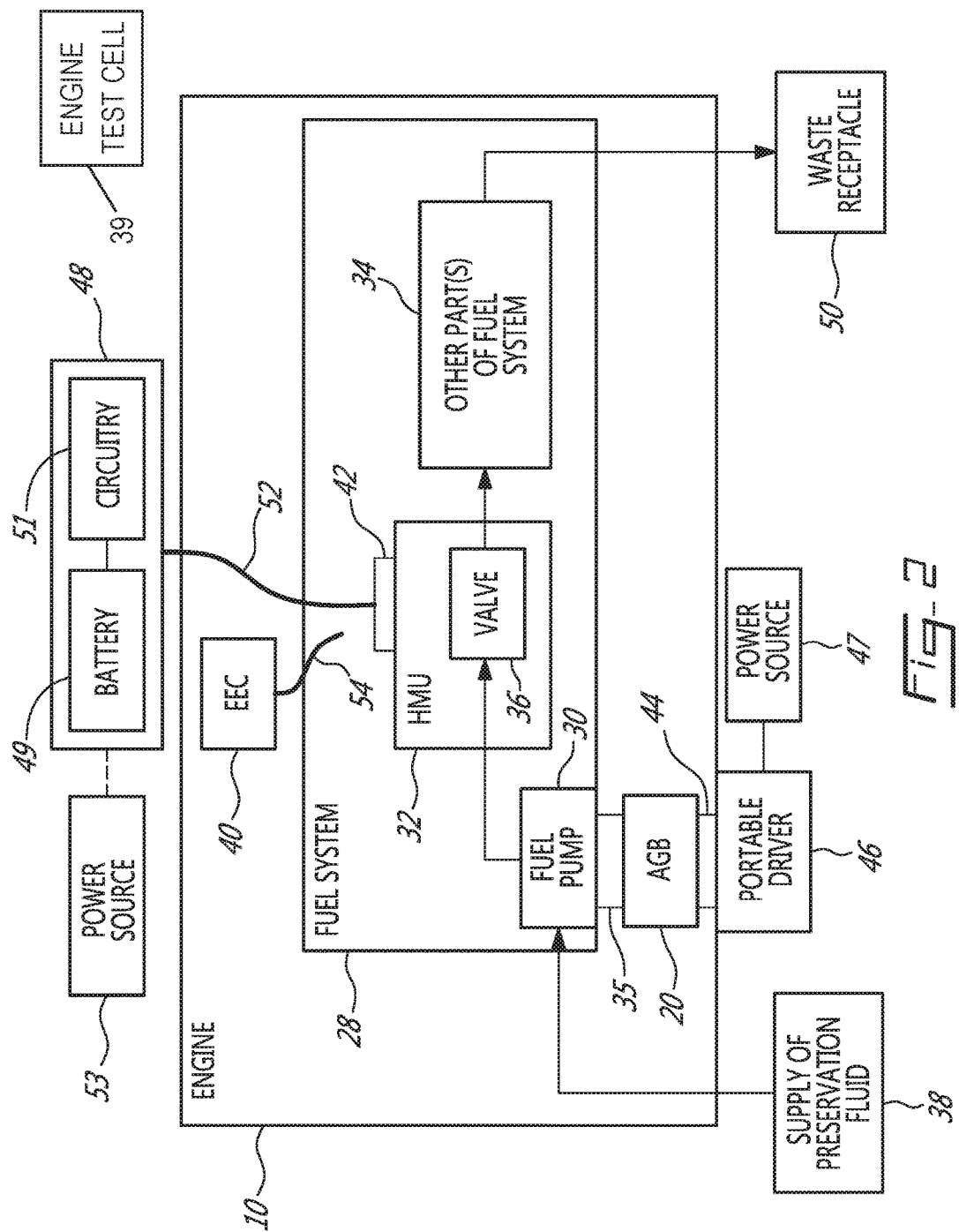
FIG. 2 schematically illustrates the engine of FIG. 1 in combination with an exemplary kit used to conduct preservation of a fuel system of the engine of FIG. 1 in preparation for a period of inactivity.

FIG. 2 schematically illustrates engine 10 in combination with exemplary devices that may be used to conduct preservation of fuel system 28 of engine 10 in preparation for a period of inactivity of engine 10. Fuel system 28 may comprise fuel pump 30, hydro-mechanical metering unit 32 (referred hereinafter as "HMU 32") and one or more other parts collectively referenced as item 34 in FIG. 2. Other part(s) 34 may include a fuel filter, a fuel/oil heat exchanger and piping for example. Fuel pump 30 may be coupled to and driven by AGB 20 via fuel pump interface 35. HMU 32 may comprise fuel metering valve 36 which may be actuated via a torque motor (not shown). Fuel metering valve 36 may require actuation during preservation of fuel system 28 in order to permit the flow of preservation fluid 38 through at least some part(s) of fuel system 28. For example, fuel metering valve 36 may require to be opened in order to permit the flow of preservation fluid 38 through some part(s) of fuel system 28.

Engine 10 may also comprise electronic engine controller 40 (referred hereinafter as "EEC 40") and related accessories that control at least some aspects of performance of engine 10. For example, EEC 40 may be configured to make decisions regarding the control of engine 10 during operation. EEC 40 may be part of a Full Authority Digital Engine Control (FADEC) which may, for example, comprise one or more digital computer(s) or other data processors. EEC 40 may be configured to provide optimum engine efficiency for a given flight condition of an aircraft to which engine 10 may be mounted. As data processors, EEC 40 may include one or more microcontrollers or other suitably programmed or programmable logic circuits. EEC 40 may be configured to control some aspect of operation of fuel system 28. For example, EEC 40 may be coupled to HMU 32 via HMU connector 42 and cable 54 so as to control fuel metering valve 36 during the operation of engine 10. As explained below, FIG. 2 shows cable 54 being disconnected from HMU connector 42 and cable 52 being connected to HMU connector 42 instead in order to carry out fuel system preservation.

AGB 20 may also comprise starter interface 44 (sometime referred to as a "starter pad") to which a suitable starter motor such as starter 27 may be coupled during operation of engine 10. Starter 27 is not shown in FIG. 2 because it has been removed from engine 10 for the storage of engine 10. Driver 46, which may be portable, is shown as being coupled to AGB 20 via starter interface 44 to carry out fuel system preservation. It is understood that driver 46 may be coupled to some interface of AGB 20 other than starter interface 44.

During preservation of fuel system 28 of engine 10, driver 46 and control device 48, which may be portable, may be used in conjunction with a supplied quantity of preservation fluid 38. Accordingly, driver 46, control device 48 and optionally the quantity of preservation fluid 38 may form a portable kit that may be taken to engine 10 for conducting fuel system preservation. For example, the use of such kit may permit fuel system preservation to be conducted without the need of an engine test cell 39. For example, the fuel system preservation may be conducted outside of an engine test cell 39 without the need for electrical power to be supplied to EEC 40. Accordingly, the use of the kit may permit the fuel system preservation to be conducted when EEC 40 is not powered. The quantity of preservation fluid 38 may be placed in fluid communication with fuel pump 30 via a suitable inlet to fuel system 28. For example, such inlet may be produced via one or more fuel tubes leading to fuel pump 30. Such kit may also comprise waste receptacle 50, which may be placed in fluid communication with an outlet of fuel system 28 during fuel system preservation. Such outlet may be produced by disconnecting one or more fuel tubes leading to combustor 16 of engine 10 and directing such fuel tube(s) toward waste receptacle 50 so that preservation fluid 38 is not directed into combustor 16.

Driver 46 may comprise a source of mechanical energy other than starter 27 but that can interface with AGB 20 via starter or other interface 44 in order to drive AGB 20 and thereby cause fuel pump 30 to also be driven via fuel pump interface 35 and AGB 20. For example, driver 46 may be an electric motor (e.g., such as a 10 A motor of a handheld drill) other than starter 27. Driver 46 may be suitable for driving part(s) of engine 10 (e.g., high-pressure shaft 24) at relatively low RPM without causing starting of engine 10 but sufficiently to drive fuel pump 30 so that preservation fluid 38 may be drawn and pumped through part(s) of fuel system 28 during preservation.

The use of driver 48 may be more efficient and user-friendly than the use of starter 27 for driving fuel pump 30. For example, the motor from a handheld drill may provide sufficient power for adequately driving fuel pump 30 for the purpose of fuel preservation on smaller gas turbine engines. Furthermore, such driver 46 may require a readily available source 47 of electrical power (i.e., 110 V or 220 V) as opposed to using starter 27. In addition, some starters of gas turbine engines may not be configured to be driven for long periods of time (e.g., longer than 30 seconds) because they are typically not required to do so during normal operation. Accordingly, some starters may risk becoming damaged if driven for longer periods of time, which could be required during fuel system preservation. However, driver 46 may not have such limitation. Driver 46 may be relatively small and light so that it may also be handheld and relatively easy to handle and carry by maintenance personnel conducting fuel system preservation. In some embodiments, driver 46 may be of the corded type for connection with power source 47, or, of the cordless type with an onboard power source.

In traditional fuel system preservation methods that require the use of an engine test cell, interfacing with engine 10 via EEC 40 may be done on some engines to cause the opening of valve 36 in HMU 32 to permit the preservation fluid to be injected into the entire fuel system 28. However, control device 48 as described herein may be used to actuate valve 36 without having to power EEC 40 or other parts of engine 10 so as to cause fuel metering valve 36 to open and permit flow of preservation fluid 38 through fuel system 28 while fuel pump 30 is driven by driver 46. Control device 48 may comprise an on-board power source such as battery 49 and suitable circuitry 51. Control device 48 may comprise, cable 52 and a connector 60B (see FIG. 7) for interfacing with HMU connector 42. Accordingly, in order to use control device 48, EEC cable 54 that normally couples EEC 40 to HMU 32 may be disconnected from HMU connector 42 no that cable 52 may be connected to HMU connector 42 instead. Control device 48 may be configured to provide an appropriate amount and form of power (e.g., 40 mA of current) in the form of a control signal to the appropriate one or more pins of HMU connector 42 in order to cause actuation (e.g., opening) of fuel metering valve 36. Battery 49 may be a 9 V battery and circuitry 51 may be configured to perform power conditioning and/or other type(s) of functions.

In some embodiments, control device 48 may be configured to be powered by battery 49 and/or by an external power source 53 (e.g., 110 V), if available. For example, control device 48 may be configured to be coupled to and generate an appropriate control signal using power from power source 53. Alternatively, if external power source 53 is not available at the location where control device 48 is used, power from battery 49 may be used to generate the control signal instead. In some embodiments, control device 48 may comprise an indicator (e.g., voltage indicator) providing an indication to the user about the amount of energy available in battery 49 to help the user decide whether battery 49 may be used to generate the control signal, whether battery 49 should be replaced, and/or whether power source 53 should be used instead of battery 49 for generating the control signal. In various embodiments, power source 53 may be the same or different from power source 47. In some embodiments, power sources 53 and/or 47 may be portable so as to be taken by maintenance personnel along with a kit as disclosed herein.

Control device 48 may also be relatively small and light so that it may also be handheld and relatively easy to handle and carry by maintenance personnel conducting fuel system preservation.

FIG. 3 schematically illustrates fuel system 28 of engine 10 in combination with exemplary devices that may be used to conduct preservation of fuel system 28 of engine 10 in preparation for a period of inactivity of engine 10.

Figure 4:
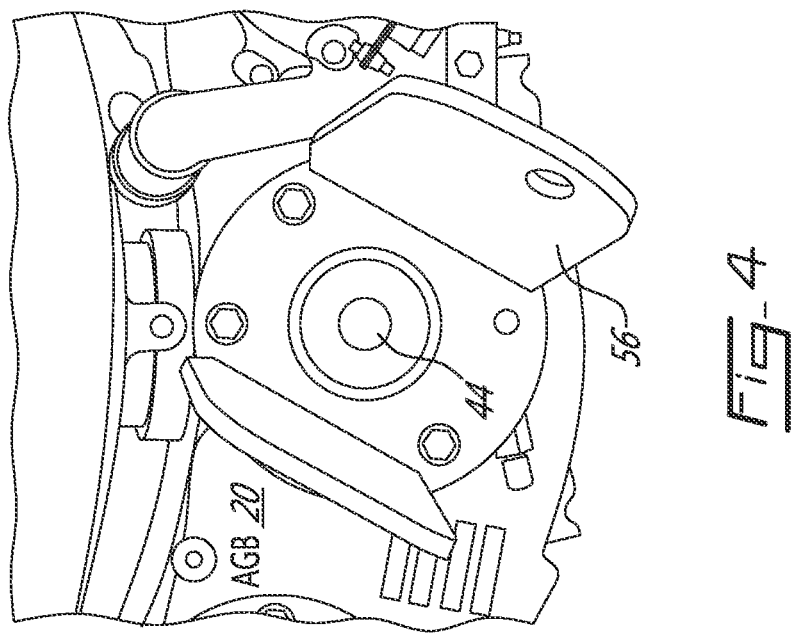
FIG. 4 is a plan view of a starter interface of an accessory gearbox of the engine of FIG. 1 on which a mounting bracket has been installed to facilitate coupling of a driver.

FIG. 4 is a plan view of starter interface 44 of AGB 20 on which mounting bracket 56 has been installed. Mounting bracket 56 may facilitate coupling of driver 46 to interface 44 of AGB 20. For example, mounting bracket 56 may be fastened to AGB 20 so as to permit driver 46 to be fastened thereto while being mechanically coupled to and driving AGB 20 in order to drive fuel pump 30 via AGB 20.

Figure 5:
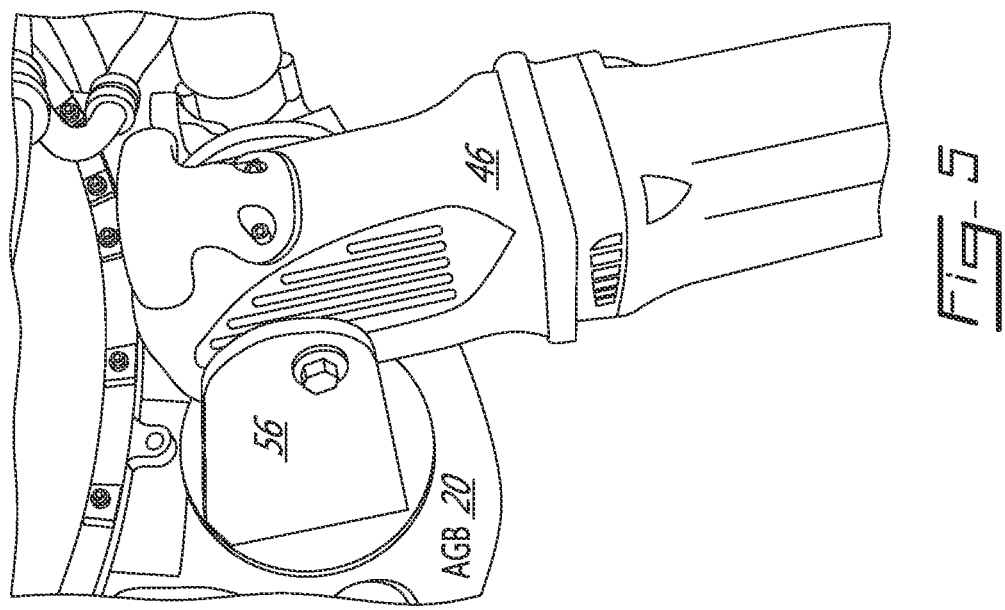
FIG. 5 is a perspective view of an exemplary driver coupled to the accessory gearbox via the mounting bracket of FIG. 4.

FIG. 5 is a perspective view of an exemplary driver 46 mechanically coupled and fastened to AGB 20 via mounting bracket 56. Driver 46 may be mounted as shown in FIG. 5 to drive fuel pump 30 via AGB 20.

Figure 6:
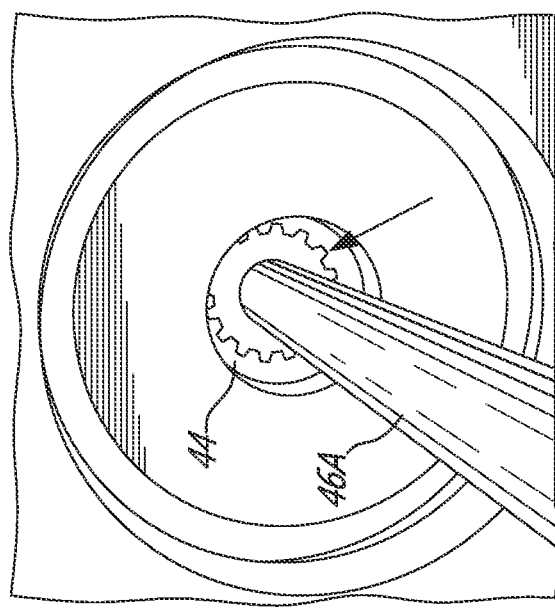
FIG. 6 is a perspective view of an exemplary output shaft of the driver of FIG. 5 where the output shaft is mechanically coupled to the starter interface of FIG. 4.

FIG. 6 is a perspective view of an exemplary output shaft 46A of driver 46 where output shaft 46A is mechanically coupled to starter interface 44 via gears so as to drive AGB 20 and consequently drive fuel pump 30.

Figure 7:
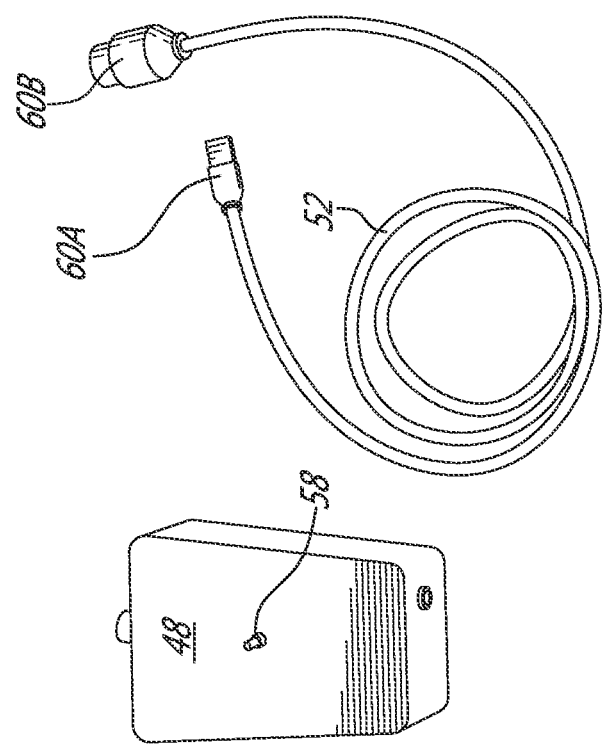
FIG. 7 is a plan view of an exemplary control device for causing a valve of the fuel system to open.

FIG. 7 is a plan view of an exemplary control device 48. Control device 48 may comprise a housing for battery 49 and circuitry 51 (see FIG. 2). Control device 48 may comprise trigger button 58 which may cause the appropriate control signal(s) to be generated and transmitted to HMU 32 via cable 52 and HMU connector 42 and thereby cause the opening of fuel metering valve 36, which may otherwise be substantially closed. Cable 52 may comprise first connector 60A for connecting to control device 48 and second connector 60B for connecting to HMU connector 42 in place of EEC cable 54 as shown schematically in FIG. 2.

FIG. 8 is a flow chart illustrating an exemplary method 800 for preserving fuel system 28 of aircraft engine 10 outside of an engine test cell in preparation for a period of inactivity of engine 10. Method 800 may be conducted using a kit including devices as disclosed herein. It is understood that some of the tasks included in method 800 may be carried out in a different order and that method 800 may comprise fewer or additional tasks than those disclosed herein. The tasks of method 800 may also be modified based on the specific situation or type of aircraft engine 10. For example, one or more other tasks that may be performed during existing fuel system preservation methods may be incorporated into method 800.

In various embodiments, method 800 may include: supplying preservation fluid 38 to fuel system 28 of aircraft engine 10 (e.g., see block 802); opening valve 36 of fuel system 28 using control device 48 coupled to fuel system 28 via HMU connector 42 configured to provide an interface between EEC 40 and fuel system 28 of engine 10 (e.g., see block 804); and driving fuel pump 30 of fuel system 28 using driver 46 coupled to (e.g., starter or other) interface 44 of AGB 20 of aircraft engine 10 to cause some of preservation fluid 38 to flow through the open valve 36 and in at least part of fuel system 28 of engine 10 (e.g., see block 806).

In various embodiments, method 800 may include: supplying preservation fluid 38 to fuel system 28 of aircraft engine 10 (e.g., see block 802); generating a signal to cause the opening of valve 36 of fuel system 28 using control device 48 other than EEC 40 of aircraft engine 10 (e.g., see block 804); and driving fuel pump 30 of fuel system 28 to cause some of the preservation fluid 38 to flow through the open valve 36 and in at least part of fuel system 28 of aircraft engine 10.

In order to carry out a fuel system preservation procedure on engine 10, maintenance personnel may carry driver 46, mounting bracket 56, manual control device 48, cable 52, a supply of preservation fluid 38, a waste receptacle 50 and any other tools that may normally be required to perform a fuel preservation to the location of engine 10. For example, fuel system preservation may be carried out at the storage location of engine 10 or at any suitable off-wing location other than an engine test cell. As explained above, driver 46 and control device 48 may be relatively easy to carry so as to facilitate fuel preservation.

In some embodiments, method 800 may comprise uncoupling starter 27 from starter interface 44 of AGB 20 and coupling driver 46 to starter interface 44 of the AGB 20. In some embodiments, method 800 may also comprise using bracket 56 to facilitate coupling of driver 46 to starter interface 44 of AGB 20.

In some embodiments, valve 36 may be a fuel metering valve of HMU 32 and method 800 may comprise using control device 48 to generate one or more signals to cause opening of valve 36. In some embodiments, method 800 may comprise uncoupling EEC 40 from fuel system 28 via HMU connector 42 and coupling control device 48 to fuel system 28 via HMU connector 42 using cable 52.

In some embodiments, method 800 may comprise: uncoupling control device 48 from fuel system 28 via HMU connector 42; uncoupling driver 46 from starter interface 44; and closing fuel system 28 in preparation for the period of inactivity.

In some embodiments, method 800 may comprise:
placing the supply of preservation fluid 38 in fluid communication with fuel pump 30;
placing waste receptacle 50 in fluid communication with an outlet of fuel system 28;
coupling driver 46 to AGB 20 via starter interface 44;
disconnecting EEC cable 54 from HMU connector 42;
connecting cable 52 of control device 48 to HMU connector 42;
depressing trigger button 58 so as to send an appropriate signal to HMU 32 and cause opening of fuel metering valve 36;
activating driver 46 so as to drive fuel pump 30 via AGB 20 and cause preservation fluid 38 to be drawn from the supply and injected into fuel system 28 and also flush out fuel from fuel system 28;
collecting the fuel and optionally some preservation fluid 38 coming out of the outlet of fuel system 28 into waste receptacle 50; and
once preservation fluid 38 has replaced the fuel in fuel system 28, disconnecting driver 46 and control device 48 from engine 10; and
closing fuel system 28 in preparation for the period of inactivity.

The above description is meant to be exemplary only, and one skilled in the relevant arts will recognize that changes may be made to the embodiments described without departing from the scope of the invention disclosed. For example, the blocks and/or tasks in the flowchart and described herein are for purposes of example only. There may be many variations to these blocks and/or tasks without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the methods, devices and kits disclosed and shown herein may comprise a specific number of elements/components, the methods, devices and kits could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for preserving a fuel system of an aircraft engine, the method being performed outside of an engine test cell in preparation for a period of inactivity of the aircraft engine and comprising:
supplying preservation fluid to the fuel system of the aircraft engine;
opening a valve of the fuel system using a control device, other than an electronic engine controller of the aircraft engine, coupled to the fuel system via a connector configured to provide an interface between the electronic engine controller of the aircraft engine and the fuel system of the aircraft engine, the opening of the valve being performed without powering the electronic engine controller of the aircraft engine; and
driving a fuel pump of the fuel system without starting the aircraft engine using a driver coupled to an accessory gearbox of the aircraft engine to cause some of the preservation fluid to flow through the open valve and in at least part of the fuel system of the aircraft engine and to flush out fuel from the fuel system.

2. The method as defined in claim 1, wherein the driver is coupled to an interface of the accessory gearbox configured for interfacing a starter of the aircraft engine to the accessory gearbox.

3. The method as defined in claim 2, comprising uncoupling the starter from the interface of the accessory gearbox and coupling the driver to the interface of the accessory gearbox.

4. The method as defined in claim 1, wherein the valve is a fuel metering valve of a hydro-mechanical metering unit of the fuel system.

5. The method as defined in claim 4, comprising, when a trigger button of the control device is depressed, causing the control device to generate a signal to cause opening of the fuel metering valve.

6. The method as defined in claim 1, comprising uncoupling the electronic engine controller of the aircraft engine from the fuel system via the connector and coupling the control device to the fuel system via the connector.

7. The method as defined in claim 1, comprising using a bracket to facilitate coupling of the driver to the interface of the accessory gearbox.

8. The method as defined in claim 1, comprising:
uncoupling the control device from the fuel system via the connector;
uncoupling the driver from the accessory gearbox; and
closing the fuel system in preparation for the period of inactivity.

9. A method for preserving a fuel system of an aircraft engine, the method being performed outside of an engine test cell in preparation for a period of inactivity of the aircraft engine and comprising:
supplying preservation fluid to the fuel system of the aircraft engine;
opening a valve of the fuel system using a control device other than an electronic engine controller of the aircraft engine and without powering the electronic engine controller of the aircraft engine; and
driving a fuel pump of the fuel system without starting the aircraft engine to cause some of the preservation fluid to flow through the open valve and in at least part of the fuel system of the aircraft engine and to flush out fuel from the fuel system.

10. The method as defined in claim 9, wherein the control device is coupled to the fuel system via a connector configured to provide an interface between the electronic engine controller of the aircraft engine and the fuel system of the aircraft engine.

11. The method as defined in claim 9, wherein driving the fuel pump is done using a driver, other than a starter of the aircraft engine, coupled to an accessory gearbox of the aircraft engine.

12. The method as defined in claim 11, wherein the driver is coupled to an interface of the accessory gearbox configured for interfacing the starter of the aircraft engine to the accessory gearbox.

13. The method as defined in claim 9, comprising uncoupling the electronic engine controller of the aircraft engine from the fuel system via a connector and coupling the control device to the fuel system via the connector.

* * * * *